United States Patent
Criel et al.

(10) Patent No.: US 9,511,747 B2
(45) Date of Patent: Dec. 6, 2016

(54) WIPER BLADE

(71) Applicant: Robert Bosch GmbH, Stuttgart (DE)

(72) Inventors: Paul Criel, Sint-Truiden (BE); Hans Beelen, Herk de Stad (BE); Peter De Block, Halen (BE); Peter Saevels, Attenrode (BE); Mohamed Aznag, Scherpenheuvel-Zichem (BE); Eric Windmolders, Kermt (BE); Jan Bonroy, Heverlee (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/815,089

(22) Filed: Jul. 31, 2015

(65) Prior Publication Data

US 2015/0353055 A1   Dec. 10, 2015

Related U.S. Application Data

(63) Continuation of application No. 13/500,996, filed as application No. PCT/EP2010/065055 on Oct. 8, 2010, now Pat. No. 9,096,196.

(30) Foreign Application Priority Data

Oct. 9, 2009   (DE) .......................... 10 2009 045 549
Oct. 7, 2010   (DE) .......................... 10 2010 042 096

(51) Int. Cl.
   *B60S 1/38*   (2006.01)

(52) U.S. Cl.
   CPC ............... *B60S 1/3891* (2013.01); *B60S 1/381* (2013.01); *B60S 1/3879* (2013.01); *B60S 1/3881* (2013.01);
   (Continued)

(58) Field of Classification Search
   CPC .. B60S 1/3879; B60S 1/3889; B60S 1/3893; B60S 1/3886; B60S 1/3887; B60S 2001/3822
   See application file for complete search history.

(56) References Cited

U.S. PATENT DOCUMENTS

| 3,386,123 A | 6/1968 | Oishei et al. |
| 3,696,497 A | 10/1972 | Quinlan et al. |

(Continued)

FOREIGN PATENT DOCUMENTS

| DE | 19860644 | 7/2000 |
| DE | 10025710 | 8/2001 |

(Continued)

OTHER PUBLICATIONS

EP0667266A1 (machine translation), 1995.*

(Continued)

*Primary Examiner* — Monica Carter
*Assistant Examiner* — Andrew A Horton
(74) *Attorney, Agent, or Firm* — Michael Best & Friedrich LLP

(57) ABSTRACT

The invention is based on a wiper blade (12) with an elongate, spring-elastic carrying element (36) which is pre-curved in a concave fashion with respect to a vehicle window (22) and has two spring rails (52, 66) which run parallel to one another in a plane, and having a wiper strip (24) which is held with a web (34) of its head strip (30) between the spring rails (52, 66) via the carrier element (36), said spring rails (52, 66) being inserted in longitudinal grooves (32) on both sides of the web (34), wherein the wiper strip (24) is secured in the longitudinal direction (20) relative to the carrier element (36) at least close to one of the ends of said wiper strip (24). It is proposed that the spring rails (52, 66) have, at the longitudinal sides facing one another in their end regions, clips (60, 74) with cutters (62, 76) which, in the mounted state, cut into adjoining walls of the longitudinal grooves (32).

16 Claims, 8 Drawing Sheets

Figure 1:
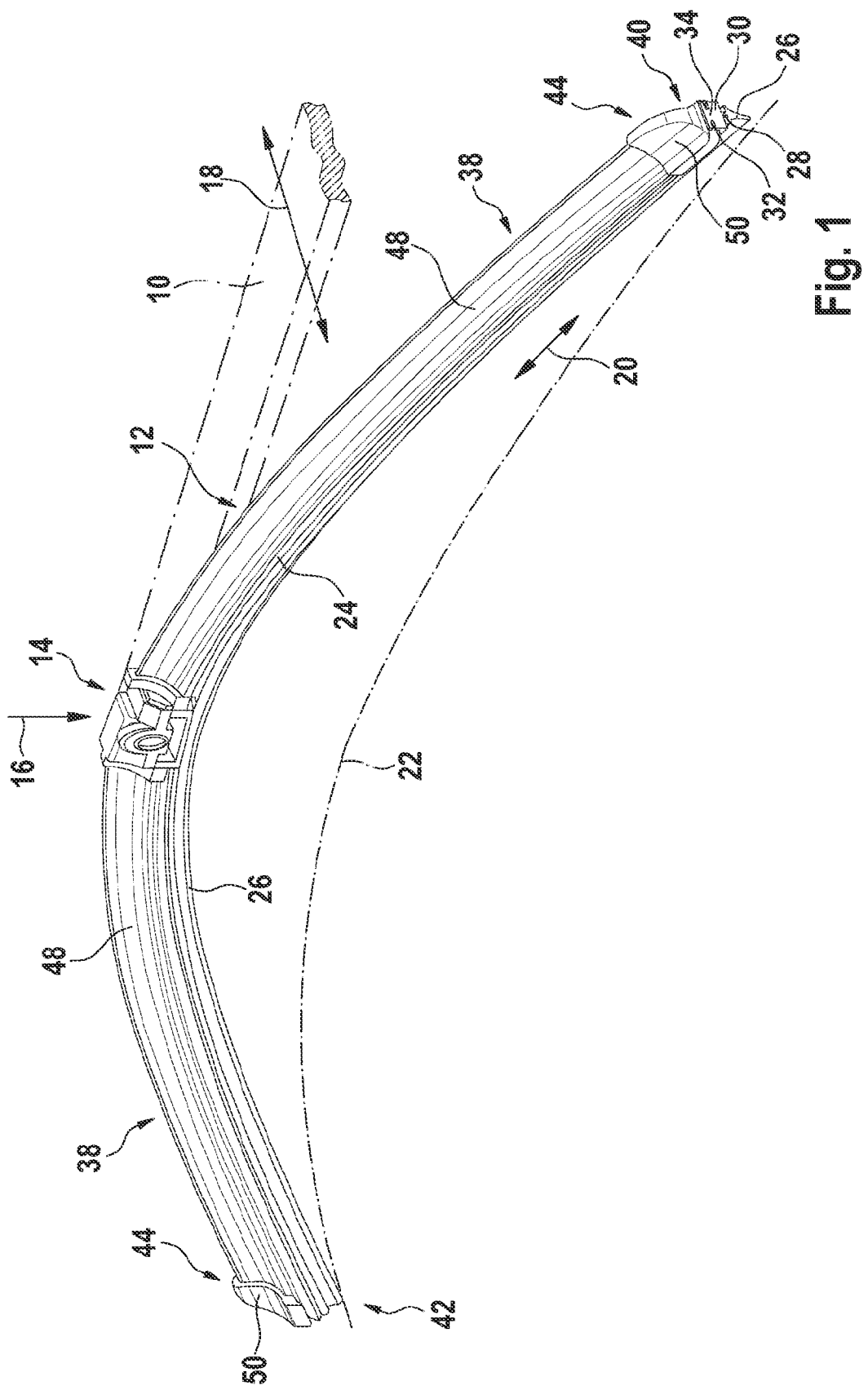

(52) U.S. Cl.
CPC ............. *B60S 1/3886* (2013.01); *B60S 1/3887* (2013.01); *B60S 2001/382* (2013.01); *B60S 2001/3822* (2013.01)

(56) References Cited

U.S. PATENT DOCUMENTS

| | | | |
|---|---|---|---|
| 4,782,549 A | 11/1988 | Beneteau et al. | |
| 5,325,564 A | 7/1994 | Swanepoel | |
| 5,493,750 A | 2/1996 | Bollen et al. | |
| 5,697,156 A | 12/1997 | Buechele | |
| 5,964,025 A * | 10/1999 | Buechele | B60S 1/38 15/250.361 |
| 6,185,805 B1 | 2/2001 | Rosiere et al. | |
| 6,836,925 B1 * | 1/2005 | Swanepoel | B60S 1/38 15/250.361 |
| 7,159,269 B2 | 1/2007 | Lee | |
| 7,559,110 B1 * | 7/2009 | Kotlarski | B60S 1/38 15/250.32 |
| 7,996,953 B2 | 8/2011 | Braun et al. | |
| 9,096,196 B2 * | 8/2015 | Criel | B60S 1/3891 |
| 2005/0044651 A1 | 3/2005 | Lee | |
| 2007/0061993 A1 | 3/2007 | Lee | |
| 2008/0235896 A1 | 10/2008 | Cheng | |
| 2010/0325829 A1 | 12/2010 | Op't Roodt et al. | |
| 2011/0126373 A1 | 6/2011 | Ishida et al. | |

FOREIGN PATENT DOCUMENTS

| | | | |
|---|---|---|---|
| DE | 10245693 | 4/2004 | |
| DE | 102005052258 | 5/2007 | |
| DE | 102005052258 A1 * | 5/2007 | ................ B60S 1/38 |
| DE | 102008000708 | 9/2009 | |
| DE | 102008000708 A1 * | 9/2009 | ............ B60S 1/3858 |
| EP | 667266 | 8/1995 | |
| EP | 2106979 | 10/2009 | |
| FR | 2502086 | 9/1982 | |
| FR | EP 0667266 A1 * | 8/1995 | ................ B60S 1/38 |
| JP | 2003523883 | 8/2003 | |
| JP | 2007210514 | 8/2007 | |
| WO | 2009071372 | 6/2009 | |

OTHER PUBLICATIONS

DE102005052258 A1 (machine translation), 2007.*
EP667266A 1 (machine translation), 1995.
PCT/EP2010/065055 International Search Report dated Jan. 14, 2011 (Translation and Original, 6 pages).
United States Patent Office Notice of Allowance for U.S. Appl. No. 13/500,996 dated Apr. 20, 2015 (8 pages).
United States Patent Office Action for U.S. Appl. No. 13/500,996 dated Aug. 26, 2014 (16 pages).

* cited by examiner

WIPER BLADE

BACKGROUND OF THE INVENTION

The invention is based on a wiper blade.

A wiper blade with an elongate, spring-elastic carrying element which is pre-curved in a concave fashion with respect to a vehicle window is known from the Word Intellectual Property Organization patent WO 2008/020003, said wiper blade having two spring rails and a wiper strip which is received by the carrying element in a manner allowing it to be exchanged. The wiper strip is fixedly connected at one of the ends thereof to a thickened portion, by means of which the wiper strip can be fixed relative to the carrier element. This results from the fact that the thickened portion can be placed in position against an end face of the spring rail or a bridge, which connects the two spring rails to one another. In this position, the wiper strip is fixed relative to the carrying element by means of an end cap. Said end cap can overlap the thickened portion and the bridge and fix them in position by means of detachable latching means. In the case of disassembly of the wiper strip of the wiper blade, the latching means are detached; thus enabling the wiper strip to be pulled out of the carrying element after removal of the end cap.

The German patent publication DE 10 2004 051 467 A1 discloses a wiper blade of the type in question. The carrying element of said wiper blade comprises two spring rails which run parallel to each other and are connected to each other at their ends by a bridge element. In order to receive a wiper strip, the spring rails form a longitudinal gap, and therefore the wiper strip can be threaded in the longitudinal direction onto the carrying element. Said wiper strip is secured in the longitudinal direction relative to the carrying element by end caps. The latter have an element with a spike which is pressed at the end of installation into a top strip of said wiper strip. In the fitted state, the spike bears against the bridge end face which faces away from the end of the wiper strip. In one exemplary embodiment, the spike is located on a spring tongue which is pressed against the head strip by a flap with an eccentric. The pivot axis of the tongue runs transversely with respect to the longitudinal direction of the wiper blade. In another embodiment, the spike is arranged directly on the flap, with the pivot axis of the flap being provided in the vicinity of the outer end face of the end cap.

The German patent publication DE 100 25 710 A1 discloses a wiper blade of flat beam construction, which has a rubber elastic wiper strip with a wiping lip. Lateral longitudinal grooves are provided between the wiping lip and a head strip, two spring rails that are pre-curved in a concave fashion with respect to the wiping lip being inserted in said grooves as a carrying element. Said two spring rails are held together by bridge elements on the ends thereof and by a center connecting element. The bridge elements comprise an integrally formed extension as a fixing means, which has on the free end thereof at least one projection directed towards the head strip. During installation, the extension is bent against the head strip so that the projection engages in said head strip and the spring rails are fixed relative to the wiper strip in the longitudinal direction. Finally, the bridge elements are covered with end caps.

The German patent publication DE 102 45 693 A1 discloses a wiper blade, which has, as carrying element, two spring rails which run in parallel and are connected to each other at their ends by a respective transverse clip. Furthermore, retaining means which fix the wiper strip relative to the spring rails are provided. In order to remove the wiper strip, the retaining means can be easily detached. They are connected on one side to the transverse clip and on the other side via a cohesive material joint, a frictional connection and/or via a form-fitting connection to the wiper strip. In one embodiment, a gudgeon reaches through a guide bore of the transverse clip into the wiper strip and is held in the assembly position by an end cap which latches on the transverse clip by means of a spring element. The spring element can be released by an externally operable element, and therefore the end cap and the gudgeon can be released in order to change the wiper strip. In the fitted state, the end cap is supported by a closed end face, which faces the end of the wiper blade, on the associated end face of the transverse clip. A different exemplary embodiment shows a retaining unit which is manufactured from sheet metal and is pressed into the wiper strip by means of a gudgeon bent toward the wiper strip. During the assembly of the spring rails, the retaining unit is pushed under the transverse clip and is latched on said transverse clip between stop surfaces and a spring tongue. After removal of the end cap, the spring tongue can be pressed into a release position and thus the spring rails can be removed.

SUMMARY OF THE INVENTION

According to the invention, the spring rails have clips with cutters at the longitudinal sides facing one another in their end regions. In the mounted state, the cutters cut into the adjoining walls of the longitudinal grooves. By means of the clips with cutters, the spring rails are directly fixed with respect to the wiper strip in the longitudinal direction without substantial effort. An advantageous embodiment results if the spring rails have recesses on the longitudinal sides in the end regions thereof. In the mounted state, the recesses lie opposite to one another and arms branch out from said recesses, which are directed outwardly at a flat angle with respect to the longitudinal direction, wherein the arms of the recesses with the inner longitudinal sides of the spring rails form the clips, which on the end face facing the recess are formed to a cutter. In the mounted state, the cutters are pressed into the web between the longitudinal grooves of the wiper strip. This can advantageously occur, e.g., by means of an end cap that is pushed onto the end of the spring rails and locks with the same.

According to a further embodiment of the invention, the spring rails likewise have recesses, which lie opposite one another in the mounted state, on the longitudinal sides in the end regions thereof; however, in this case have notches, which form the clips, at least at one delimitation. Said notches are bent up with respect to the spring rails and have cutters on the projecting edges. If the spring rails are pushed laterally into the longitudinal grooves, the cutters catch in the flanks of the longitudinal grooves so that the spring rails are also in this case fixed relative to the wiper strip directly in the longitudinal direction. The longitudinal rails are advantageously held together, e.g., by the end cap. In principle, the clips including the cutters can be provided at both ends of the spring rail. It is normally however sufficient for them to be disposed only at one end and in fact advantageously on the outer end of the wiper blade so that the wiper strip is subjected to pressure by means of centrifugal force during operation.

According to a further embodiment of the invention, a connecting piece comprising lateral guide profiles is guided on the spring rails and presses the same together. In the mounted state, spring tongues on the guide profiles thereby engage in recesses of the spring rails. In so doing, the cutters can engage in the web or respectively in the flanks of the longitudinal grooves of the wiper strip and hold said strip in position. The spring tongues are advantageously formed by notches from one of the limbs of the guide profiles and extend in each case up to the opposite limb. When disassembling the connecting piece, the spring tongues can be moved from the detent position into a release position by means of openings in the guide profiles. In the assembled position, the guide profiles rest in each case with a hook on the end faces of the spring rails. The hook is formed from an elongated, bent limb on the outer end of the guide profiles.

In addition to the fixation resulting from the cutters on the clips of the spring rails, provision can be made for a second fixation. For this purpose, a window, into which a clip originating at a delimitation projects, is provided in a top wall, which connects the guide profiles to one another. A claw, which is bent in the direction toward the head strip, is located on the free end of the clip, said clip penetrating the head strip in the mounted state. In order to facilitate the assembly of the connecting piece, the limbs of the guide profiles are bent up towards the outside on the ends facing the spring rails. The connecting piece is advantageously manufactured as a sheet metal bending part. It can however also be manufactured from plastic in an injection molding process.

This conversely applies to a connecting piece according to a further embodiment. The connecting piece is guided with lateral guide profiles on the spring rails and presses said rails together, wherein centering blocks on the guide profiles engage in the assembled position in recesses on the outer longitudinal sides of the spring rails. The centering blocks rest in the longitudinal direction on the delimitations of the recesses and are therefore secured in both directions relative to the spring rails.

The guide profiles are connected to one another by a top wall, which has a longitudinal channel for the head strip of the wiper strip, wherein a window is provided in the top wall, in which a spring tongue originating at a delimitation projects. A wedge shaped piece is provided on the free end of said guide profiles, said wedge shaped piece being pressed by the end cap against the head strip in the mounted state. Assembly is also advantageously facilitated in this case if the inner edges on the end face of the guide profiles are in each case chamfered.

BACKGROUND OF THE INVENTION

Further exemplary embodiments and advantages result from the following description of the drawings. Exemplary embodiments of the invention are depicted in the drawings. The drawings, the description and the claims contain numerous features in combination. The specialist in the field will also advantageously consider the features in isolation and integrate them into useful further combinations.

Figure 2:
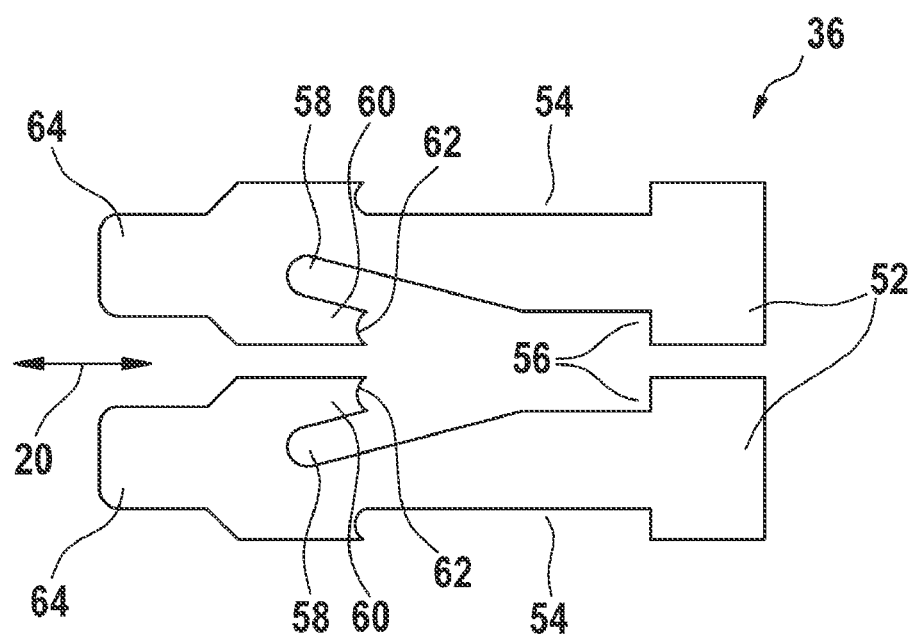
Figure 3:
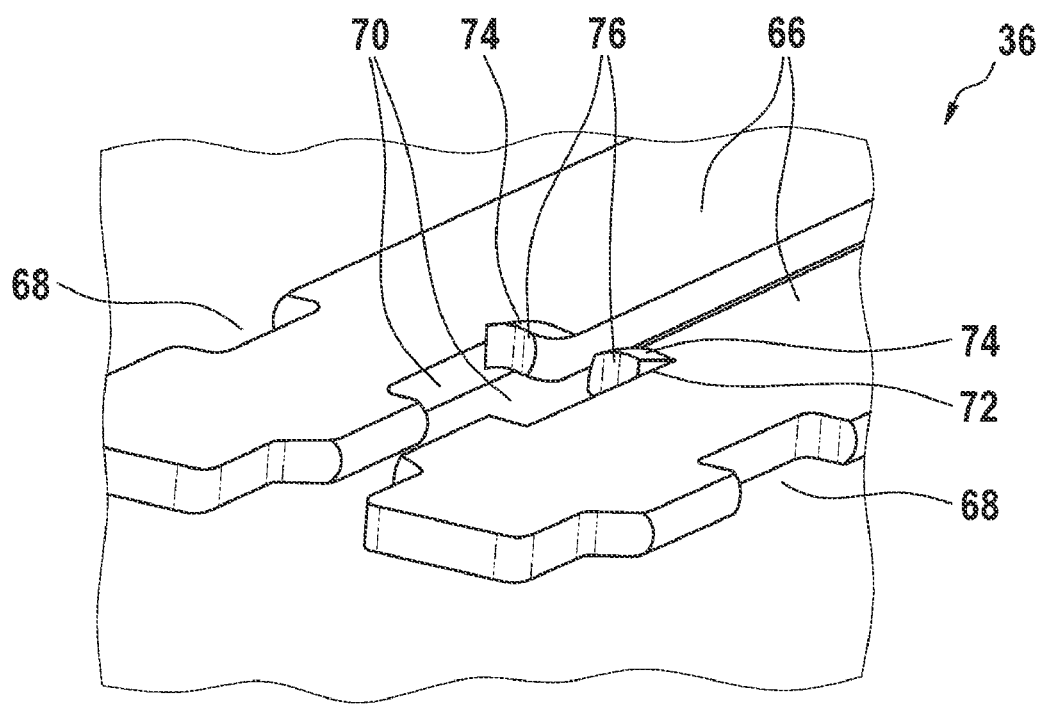
Figure 4:
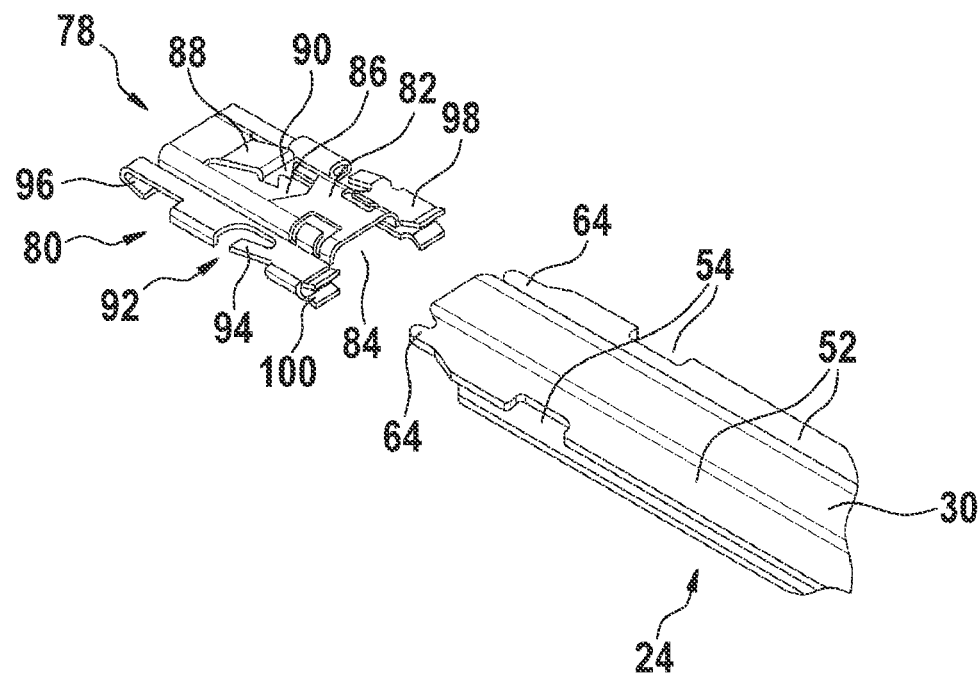
Figure 5:
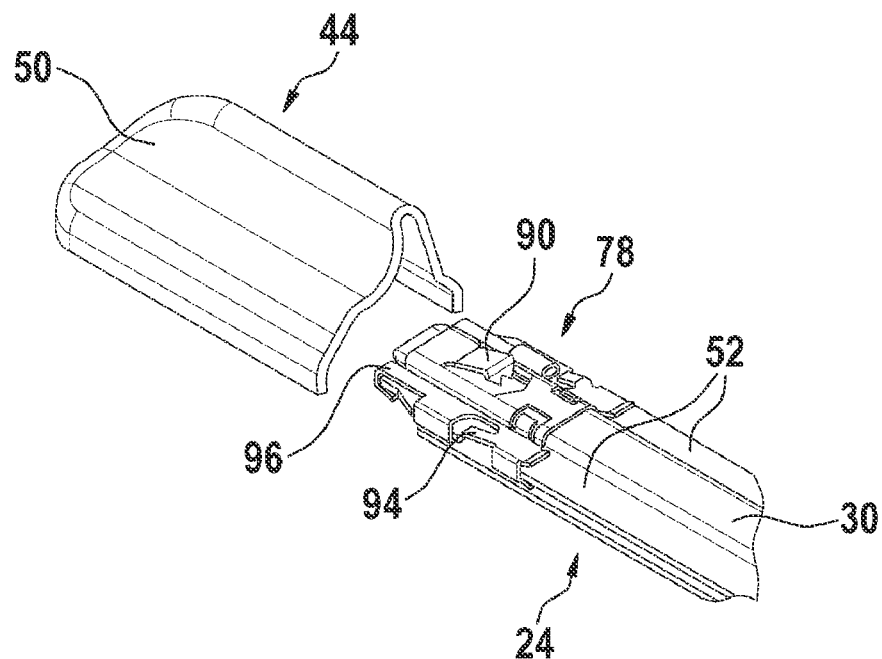
Figure 6:
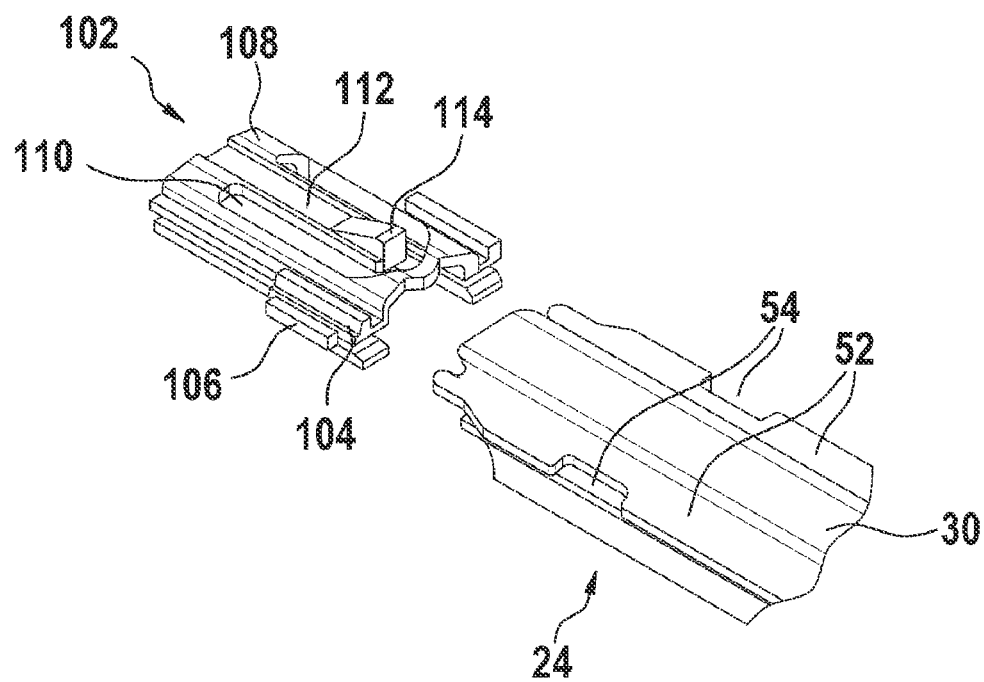
Figure 7:
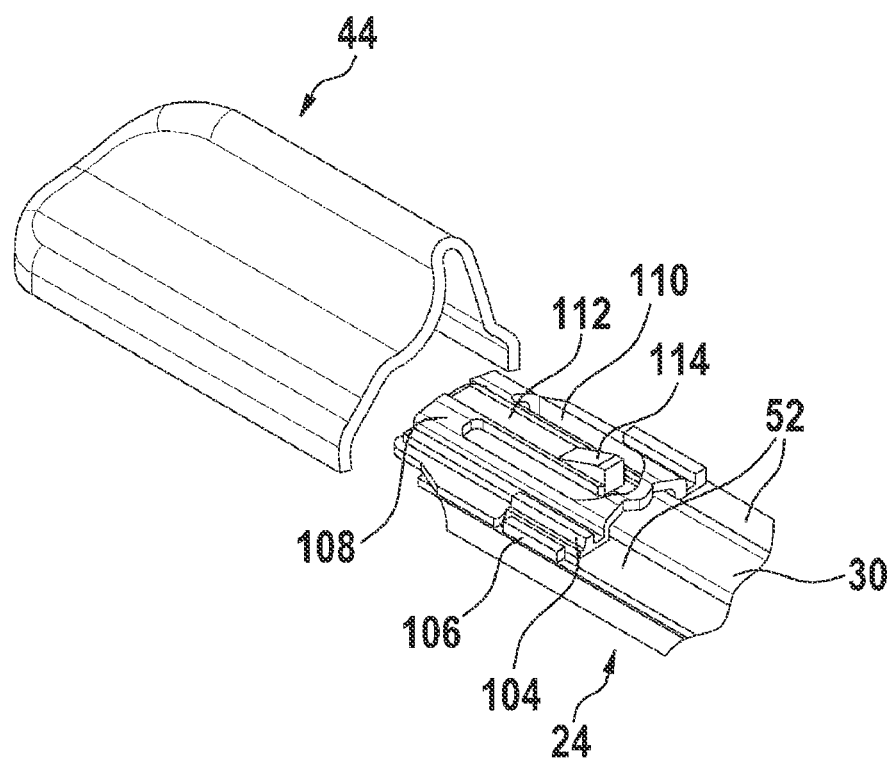
Figure 12:
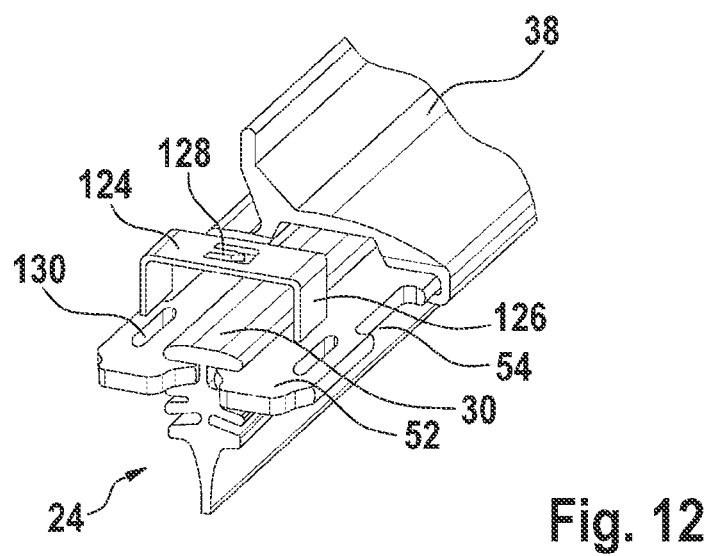
Figure 13:
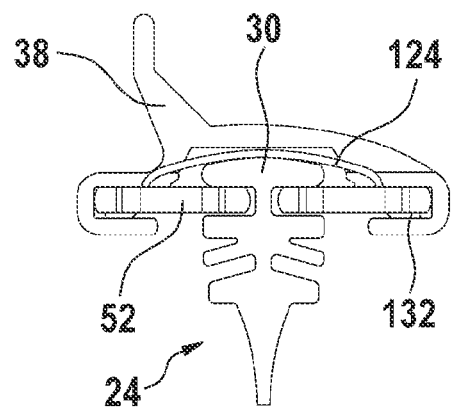
Figure 14:
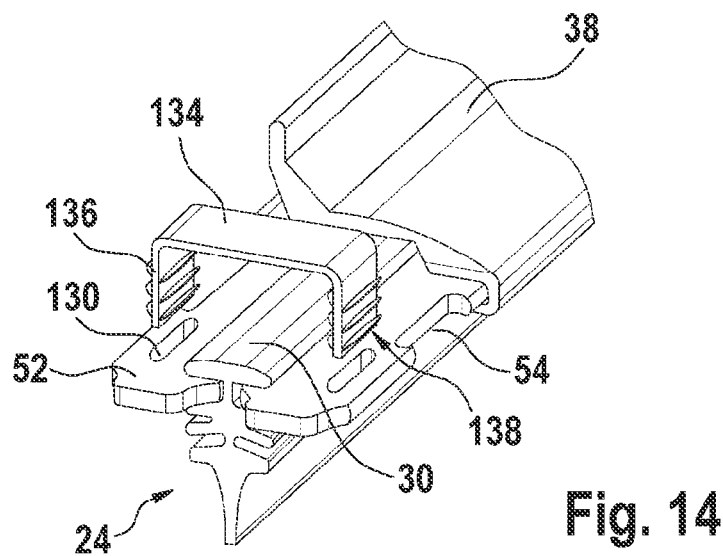
Figure 15:
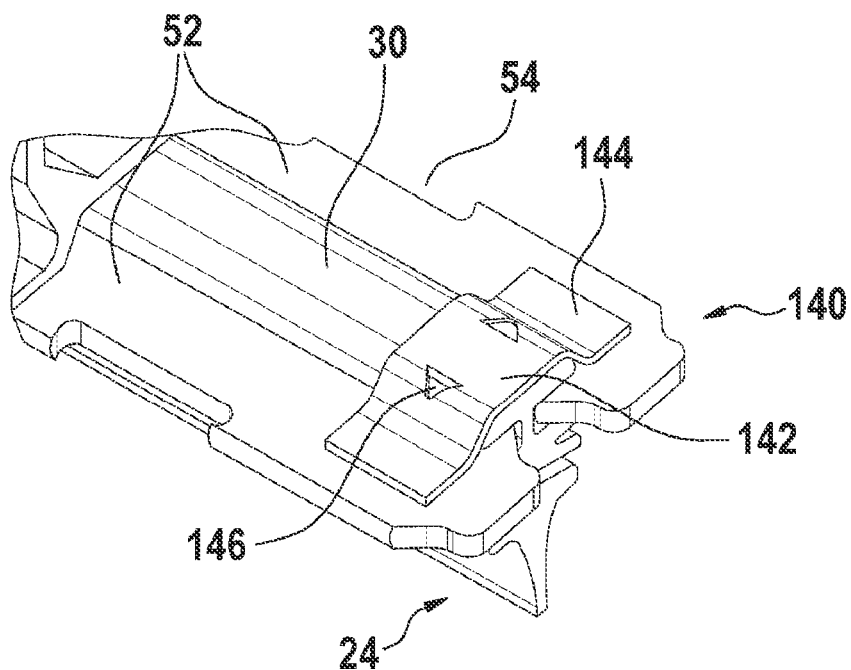
Figure 16:
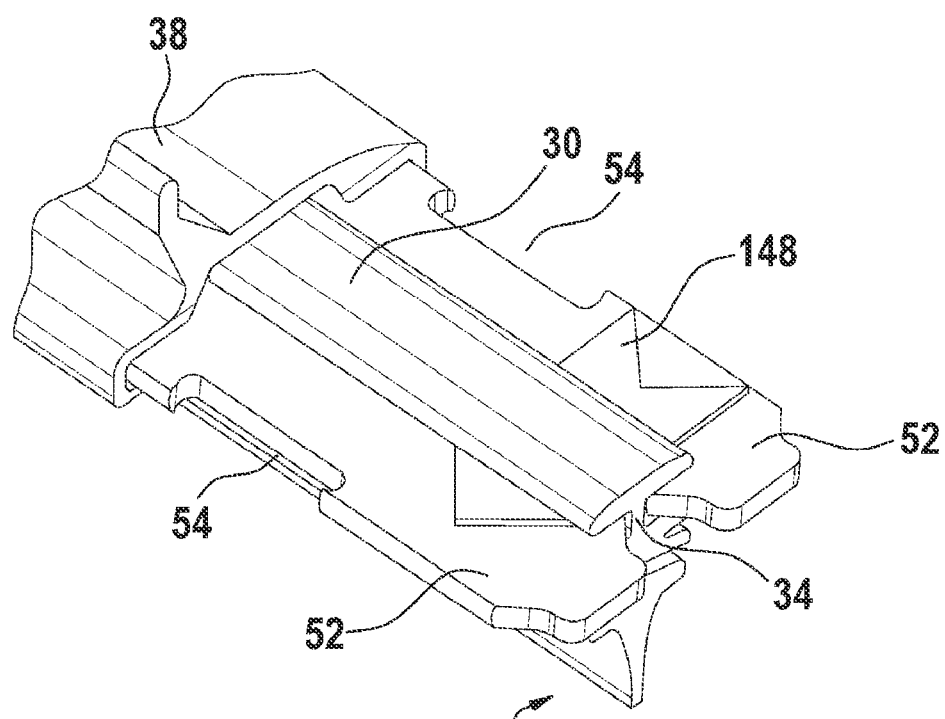

In the drawings:

FIG. 1 shows a perspective view of a wiper blade,

FIG. 2 and FIG. 3 show in an enlarged scale a top view of the ends of two spring rails which are disposed in a plane parallel to one another and in mirror symmetry, FIG. 4 shows a perspective depiction of an end of a wiper blade having a detachable connecting piece for the spring rails during assembly, FIG. 5 shows the wiper blade pursuant to FIG. 4 shortly before completion of the assembly, FIG. 6 and FIG. 7 show a variant to FIG. 4 and FIG. 5, FIG. 8 and FIG. 9 show a further variant to FIG. 4 and FIG. 5, FIG. 10 and FIG. 11 show a wiper strip pursuant to FIG. 4 and FIG. 5, FIG. 12 and FIG. 13 show a further variant pursuant to FIG. 4 and FIG. 5, FIG. 14 shows a variant comprising a bracket clip, FIG. 15 shows a variant comprising a connecting piece connected to the carrying element in a form-fit manner and FIG. 16 shows a variant to FIG. 15.

DETAILED DESCRIPTION

A wiper blade 12 comprises a spring-elastic carrying element 36 which is elongated in a ribbon like manner in the form of two spring rails 52, 66 which run parallel to and spaced apart from one another in a plane (FIG. 1 and FIG. 3). Said spring rails are inserted with their inner edge strips, which face each other, into longitudinal grooves 32 of a head strip 30 of a wiper strip 24 while their outer edge strips laterally protrude to some extent out of the longitudinal grooves 32. A web 34 is located between said longitudinal grooves 32.

A wiper lip 26 attaches to the head strip 30 via a rocker web 28 in the direction of a vehicle window 22, said wiper lip sliding over the vehicle window 22 during a wiping movement in the direction of a double arrow 18. For this purpose, a wiper arm 10 drives the wiper blade 12 via a connecting device, the component 14 of which on the wiper blade side can be connected in an articulated and detachable manner to the wiper arm 10 whereas said component is fixedly seated in the central region of said wiper blade 12 on the carrying element 36 thereof. At the same time, said wiper arm 10 loads the wiper blade with a contact pressing force 16 in the direction of the vehicle window 22. Said wiper arm 10 and said vehicle window 22 are indicated by dashed/dotted lines. During operation, the ends 40, 42 of the wiper blade 12 describe circular arcs during a pivot movement in the direction of the double arrow 18 about a wiper shaft that is not depicted, wherein the inner end 40 describes an inner circular arc and the outer end 42 an outer circular arc.

The most pronounced curvature of the vehicle window 22 is less than the curvature of the unloaded wiper blade 12 (FIG. 1) lying with both ends 40, 42 thereof on the vehicle window 22. When subjected to contact pressing force 16, the wiper blade 12 including the wiper lip 26 thereof is applied to the vehicle window 22 across the entire length thereof. In so doing, a stress develops in the spring-elastic carrying element 36 manufactured from metal or plastic. Said stress provides for a correct application of the wiper strip 24 or respectively the wiper lip 26 to the vehicle window 22 across the entire length of said wiper strip or said wiper lip as well as for an even distribution of the contact pressing force.

Spoiler parts 38, which are guided on the carrying element 36, attach in the longitudinal direction 20 to both sides of the connecting element 14 on the wiper blade side. End caps 44 are provided on the ends 40, 42 of the wiper blade 12, are guided on and lock to the carrying element 36 and cover the ends of the spoiler parts 38. Said spoiler parts 38 have a flow profile 48, whereas the flow profiles of the end caps are labeled with the reference number 50.

The spring rails 52 or 66 are preferably fixed only on one end, advantageously on the outer end 42 of the wiper blade 12, relative to the wiper strip 24. For this purpose, said spring rails 52 have recesses on the longitudinal sides in the end regions thereof, said longitudinal sides being opposite to one another in the mounted state. Arms 58, which are outwardly directed at a flat angle with respect to the longitudinal direction 20, branch off from these recesses. The arms 58 of the recesses 56 form wings 60 with the inner longitudinal sides of the spring rails 52, said wings being formed into cutters 62 located on the end faces facing the recesses 56 and adjacent to the web 34 between the longitudinal grooves 32 of the wiper strip 24. During assembly, the ends of the spring rails 52 are pressed against the web 34 and said web therefore penetrates to a certain extent into the recesses 56 and the cutters 62 catch in said web 34. Said spring rails 52 are held together by suitable means, e.g. by the end cap 44, which can lock with detent means, which are not specified in detail, in recesses 54 on the outer longitudinal sides of said spring rails 52. The sections 64 of said spring rails 52 protruding in the longitudinal direction 20 beyond the recesses 56 or respectively beyond the arms 58 have a reduced width with respect to the central sections of said spring rails 52.

The spring rails 66 pursuant to FIG. 3 are different from the spring rails 52 pursuant to FIG. 2 in that the recesses lying opposite to one another have a notch 72 in the longitudinal direction on one end thereof, whereby lugs 74 are formed. The lugs 74 of the spring rails 66 are bent up towards a broadside of said spring rails 66, the protruding edges being formed as cutters 76. When mounting the spring rails 66 transversely to the longitudinal direction 20 of the wiper strip 24, the cutters 76 penetrate into the adjoining groove flanks of the longitudinal grooves 32 and interlock with said groove flanks and therefore said spring rails 66 are fixed in the longitudinal direction 20 relative to the wiper strip 24. Said spring rails are then held together by suitable means, e.g. by the end cap 44, which lock in the outer recesses 68.

According to one embodiment pursuant to FIG. 4 and FIG. 5, a connecting piece 78 holds the spring rails 52 together instead of the end cap 44 and therefore the spring rails are fixed in the longitudinal direction 20 relative to the wiper strip 24. The connecting piece 78 has guide profiles 80 on the longitudinal sides thereof. Said guide profiles have a U-shaped cross-section which is open to the inside. Said guide profiles 80 are connected to each other by a top wall 82, which has a longitudinal channel 84 in the central region for receiving the head strip 30. During assembly, said connecting piece 78 is pushed from the end face onto the spring rails 52 until hooks 96, which are integrally formed on the ends of the guide profiles 80, bear against the end faces of said spring rails 52 (FIG. 5). In this position, spring tongues 94 engage in the recesses 54 of said spring rails 52. The spring tongues 94 are in each case notched from one of the limbs 98, 100 of the associated guide profile and bent toward the opposing limb 98, 100. It is advantageous for the guide profile to have an opening 92 in the region of the spring tongue 94 so that the spring tongue 94 can again be detached by a tool. In order to facilitate assembly, the limbs 98, 100 are bent open a little bit upwards and downwards in opposite directions to each other so that the connecting piece 78 can easily be pushed over said spring rails 52. The top wall 82 has a window 86, into which a clip 88 projects, which has an angled claw 90 on the free end thereof. In the end position of the connecting piece 78, the claw 90 is pressed into the head strip 30 of the wiper strip 24. This fixation can additionally or alone secure the relative position of said wiper strip 24 with respect to said spring rails 52. The connecting part 78 is advantageously manufactured from sheet metal. It can however also be manufactured from plastic.

In the exemplary embodiment pursuant to FIG. 6 and FIG. 7, a similar connecting piece 102 is provided, which is advantageously manufactured from plastic. It has guide profiles 104 on the longitudinal sides thereof, said guide profiles being connected to each other by a top wall 108. A window 110 is provided in said top wall, wherein a spring tongue 112 from a delimitation of the window 110 projects into said window 110. A wedge shaped piece 114, which runs to the end 42 of the wiper blade 12 while being inclined toward the spring tongue 112, is integrally formed on the free end of the spring tongue 112. The connecting piece 102 has centering blocks 106 in the region of the guide profiles 104 thereof, said centering blocks fitting into the recesses 54 on the outer longitudinal sides of the spring rails 52. During assembly, the connecting piece 102 is pushed frontally onto the spring rails 52, wherein the guide profiles 104 laterally widen until the guide blocks 106 engage in the recesses 56. If the end cap 44 is pushed onto the end of the wiper blade 12, inner locking elements, which are not visible, press on the wedge shaped piece 114 and press the spring tongue 112 onto the head strip 30, and therefore the carrying element 36 in the form of spring rails 5 is additionally or alone secured to the fixation described above relative to the wiper strip 24. The connecting piece 102 is advantageously manufactured from plastic.

Figure 8:
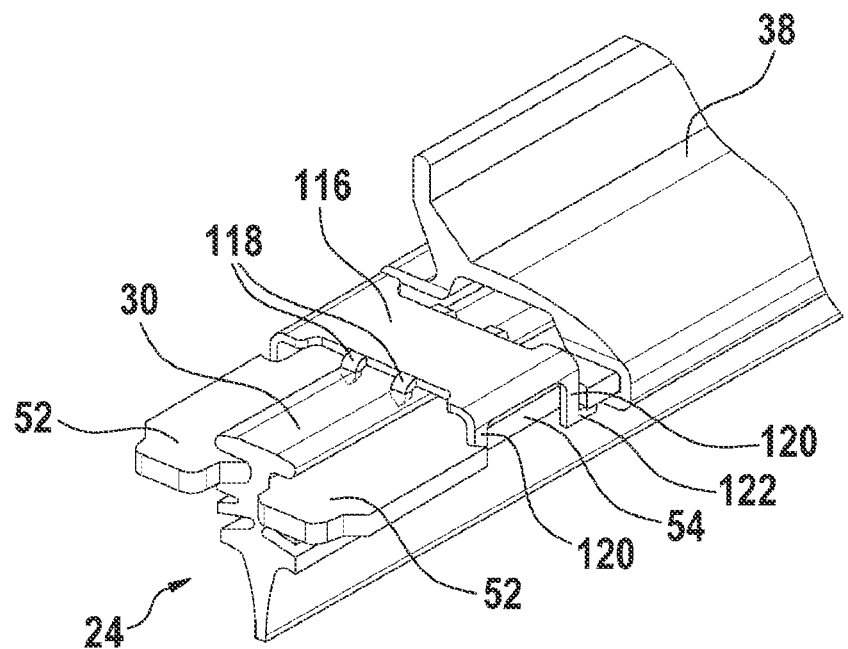
Figure 9:
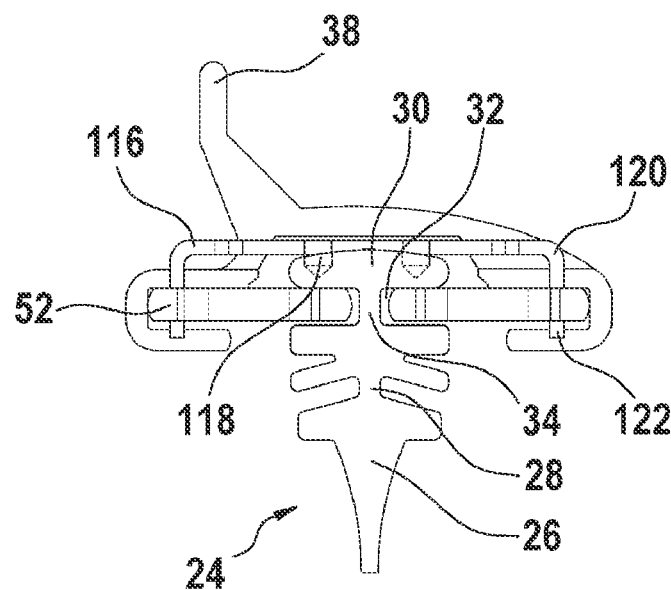

In the embodiment pursuant to FIG. 8 and FIG. 9, the spring rails 52 are braced together by a bracket 116, which laterally encompasses said spring rails 52 with claws 118, which rest against the delimitations in the longitudinal direction of the recesses 54. In so doing, noses 122, which are oriented in the longitudinal direction 20 and are integrally formed on the claws 118, grip said spring rails 52 from below. Further claws 118 on the top side of the bracket 116 grip in the mounted state into the head strip 30 of the wiper strip 24 from above and therefore constitute a further fixation between the wiper strip 24 and said spring rails 52.

Figure 10:
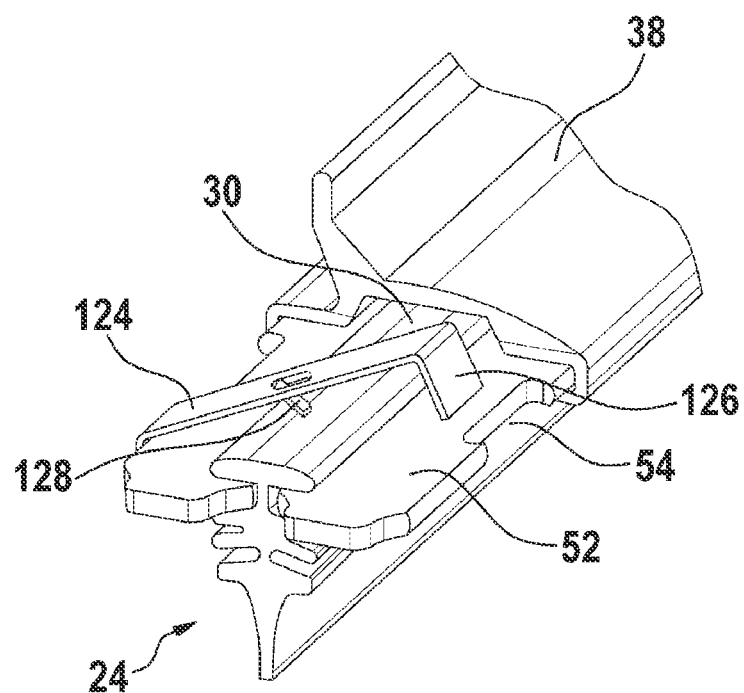
Figure 11:
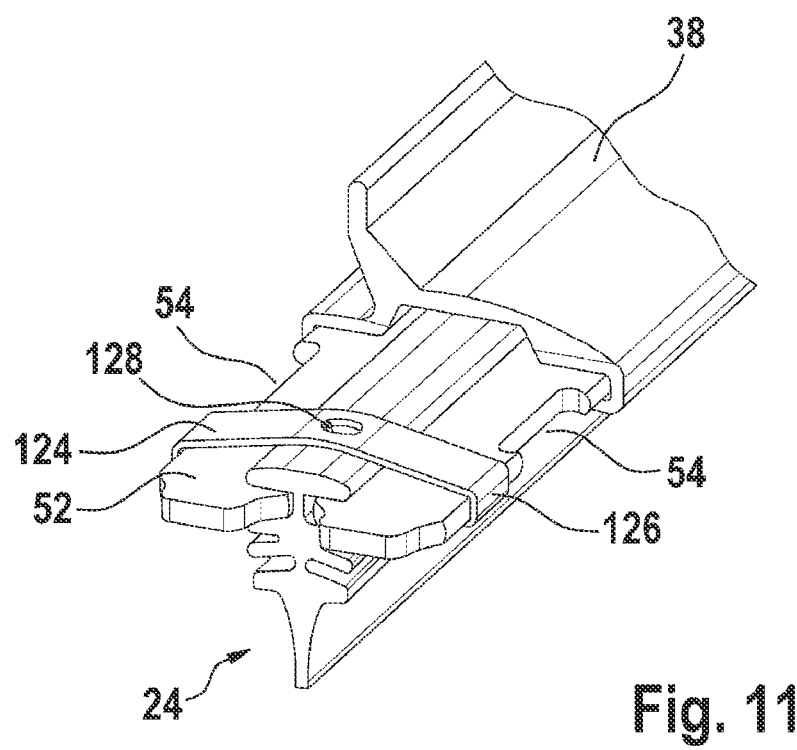

The exemplary embodiment pursuant to FIG. 10 and FIG. 11 distinguishes itself from the preceding exemplary embodiment by virtue of the fact that a brace 124 made of thin sheet metal is stretched over the head strip 30, wherein the limbs 126 of the brace 124 are bent around the outer longitudinal sides of the spring rails 52. During assembly, a gudgeon 128, which is notched from the center part of the brace 127 and is bent towards the head strip 30, penetrates said head strip 30.

The exemplary embodiment pursuant to FIG. 12 and FIG. 13 distinguishes itself from the exemplary embodiment pursuant to FIG. 10 and FIG. 11 by virtue of the fact that the spring rails 52 have apertures 130 between the recesses 54 thereof and the outer end 42, through which the limbs 126 of the holding clip 124 are guided; and after passing through the apertures 130, said limbs are preferably bent outwards.

The exemplary embodiment according to FIG. 14 shows a connecting piece in the form of a bracket clip 134, the limbs 136 of which have a fir tree shaped profile 138 in the mounting direction. Said limbs 136 are inserted through the apertures 130 and secured in their position by means of the profile 138. In the embodiments pursuant to FIG. 15 and FIG. 16, the spring rails 52 are held together by connecting parts 140 or 148 by said spring rails being connected transversely with respect to the longitudinal direction 20 via a cohesive material joint that is subjected to a preload in the plane of the spring rails 52. The connecting part 140 (FIG. 15) is manufactured from thin sheet metal in the shape of a bridge and is preferably connected at the feet 144 thereof to said spring rails 52 by welding. In the mounted state, noses 146 press against the head strip 30 and therefore additionally secure the wiper strip 24 relative to said spring rails 52.

The connecting part 148 pursuant to FIG. 16 is configured arrow-shaped and preferably has a thin wall thickness. It is pushed through the web 34 between the back of the head strip 30 and the top surfaces of the spring rails 52 and therefore secures the relative position of the wiper strip 24 with respect to said spring rails 52.

What is claimed is:

1. A wiper blade (12) having an elongate, spring-elastic carrying element (36), which is pre-curved in a concave fashion with respect to a vehicle window (22) and has two spring rails (52, 66) which run parallel to one another in a plane, and having a wiper strip (24) which is held with a web (34) of a head strip (30) between the spring rails (52, 66) via the carrying element (36), said spring rails being inserted in longitudinal grooves (32) on both sides of the web (34), wherein the wiper strip (24) has ends and is secured in the longitudinal direction (20) relative to the carrying element (36) at least close to one of the ends of said wiper strip, characterized in that the spring rails (52, 66) have, at inner longitudinal sides facing one another in end regions, clips (60, 74) with cutters (62, 76), which, in a mounted state, cut into adjoining walls of the longitudinal grooves (32), wherein the two spring rails (52, 66) include recesses (54, 68) along outer longitudinal sides of the spring rails (52, 66), the recesses (54, 58) being exposed laterally outwardly along the longitudinal sides such that the recesses are not fully enclosed by the spring rails (52, 66), wherein the wiper blade (12) further includes a bracket (116) with a planar top portion that extends between the two spring rails (52, 66), wherein the bracket (116) includes two claws (120) that extend from opposite ends of the planar top portion, wherein the two claws (120) press and hold the spring rails (52, 66) together, wherein the two claws (120) extend into the recesses (54, 68) in the spring rails (52, 66) and interlock with the spring rails (52, 66), and wherein portions (122) of the claws (120) extend underneath the spring rails (52, 66) and directly contact lower surfaces of the spring rails (52, 66).

2. The wiper blade (12) according to claim 1, characterized in that a connecting piece (102) comprising lateral guide profiles (104) is guided on the spring rails (52, 66) and presses said spring rails together, wherein centering blocks (106) on the guide profiles (104) engage in recesses (54, 68) on outer longitudinal sides of the spring rails (52, 66) in the mounted state.

3. The wiper blade (12) according to claim 2, characterized in that the guide profiles (104) are connected to one another by means of a top wall (108), which has a longitudinal channel for the head strip (30) of the wiper strip (24), wherein a window (110) is provided in the top wall (108) and wherein a spring tongue (112) originating at a delimitation projects in said window, said spring tongue comprising a wedge shaped piece (114) on a free end thereof and in the mounted state being pressed by the end cap (44) against the head strip (30).

4. The wiper blade (12) according to claim 2, characterized in that the inner edges on an end face of the guide profiles (104) are chamfered.

5. The wiper blade (12) according to claim 1, characterized in that the portions (122) of the claws (120) that extend underneath the spring rails (52, 66) are elongate noses (122) oriented along a longitudinal direction (20), and wherein the planar top portion extends in an elongate manner along a direction that is perpendicular to the longitudinal direction (20).

6. The wiper blade (12) according to claim 5, wherein the two claws (120) include arms that extend alongside the spring rails (52, 66) within the recesses (54, 68), and wherein the elongate noses (122) extend perpendicularly from the arms.

7. The wiper blade (12) according to claim 6, wherein the bracket (116) comprises additional claws (118) which are located on end faces thereof and are oriented in a longitudinal direction (20) and which in the mounted state penetrate into a side of the head strip (30) facing said additional claws (118).

8. The wiper blade (12) according to claim 6, wherein one of the arms and one of the elongate noses (122) forms an L-shaped structure that is received in part underneath a portion of one of the spring rails (52, 66).

9. The wiper blade (12) according to claim 1, characterized in that the bracket (116) comprises additional claws (118) which are located on end faces thereof and are oriented in a longitudinal direction (20) and which in the mounted state penetrate into a side of the head strip (30) facing said additional claws (118).

10. The wiper blade (12) according to claim 1, characterized in that a holding clip (124) encompasses ends of the spring rails (52, 66) outside of recesses (54, 68) on outer longitudinal sides of the spring rails with inwardly bent limbs (126) thereof, wherein a gudgeon (128) penetrates the head strip (30) in the mounted state.

11. The wiper blade (12) according to claim 1, characterized in that limbs (126) of a holding clip (124) are guided through apertures (130) and ends of said limbs are bent towards an outside.

12. The wiper blade (12) according to claim 1, characterized in that limbs (136) of a bracket clip (134) are guided through apertures (130) on ends of the spring rails (52, 66) and fir tree shaped profiles (38) interlock with the apertures (130).

13. The wiper blade (12) according to claim 1, characterized in that the spring rails (52, 66) are braced by a bridge shaped connecting part (140) having a low material thickness, wherein feet (144) are adhesively bonded or welded to the spring rails (52, 66) and noses (146) are integrally formed on a center section (142) of the connecting part (140), said noses engaging with the head strip (30) in the mounted state.

14. The wiper blade (12) according to claim 1, characterized in that an arrow-shaped connecting part (148) is guided transversely to the web (34) and through the same between a part of the head strip (30) projecting over the spring rails (52, 66) and the spring rails (52, 66) and is connected to said spring rails (52, 66) by means of adhesive bonding or welding.

15. The wiper blade (12) according to claim 1, further comprising a connecting element (14) that couples the wiper blade (12) to a wiper arm.

16. The wiper blade (12) according to claim 15, wherein the bracket (116) is disposed adjacent an end of the wiper blade, and wherein the connecting element (14) is disposed in a central region of the wiper blade.

* * * * *